United States Patent

[11] 3,542,339

[72] Inventor Richard T. Cornelius
 Minneapolis, Minnesota
[21] Appl. No. 809,226
[22] Filed March 21, 1969
 Continuation-in-part of Ser. No. 497,417,
 Oct. 18, 1965, now Pat. No. 3,455,332
[45] Patented Nov. 24, 1970
[73] Assignee The Cornelius Company
 Anoka, Minnesota
 a corporation of Minnesota

[54] VALVE ASSEMBLY
 6 Claims, 3 Drawing Figs.
[52] U.S. Cl. .................................................. 251/303,
 251/368; 222/556
[51] Int. Cl. ................................................... F16k 1/16,
 F16k 51/00
[50] Field of Search........................................... 137/604-
 −607, 602, 601, 609, 525.3, 315, 377, 381, 382;
 251/342, 367, 130, 298, 303, 368, 361, 367, 335,
 238; 222/145, 182, 571, 517, 527, 556; 239/145,
 600; 16/110, 110.5

[56] References Cited
 UNITED STATES PATENTS
 1,015,980  1/1912  Robbins .................... 251/303
 2,760,516  8/1956  Fogg et al. ................. 251/298X
 3,102,712  9/1963  Zilk........................... 251/298
 FOREIGN PATENTS
 100,089  10/1940  Sweden..................... 251/298

Primary Examiner—Henry T. Klinksiek
Attorney—Hill, Sherman, Meroni, Gross and Simpson ABSTRACT: A valve assembly includes a sealing ring clamped between a pair of blocks and encircling a fluid passage, a valve seat in said passage opening into a chamber between said blocks, a rigid actuating arm formed integral with the sealing ring and projecting radially inwardly to a point opposite the valve seat and projecting radially outwardly beyond the blocks, and a valve member of elastomeric material softer than the elastomeric material of the sealing ring, carried on the inner end of the rigid actuating arm.

Patented Nov. 24, 1970 3,542,339
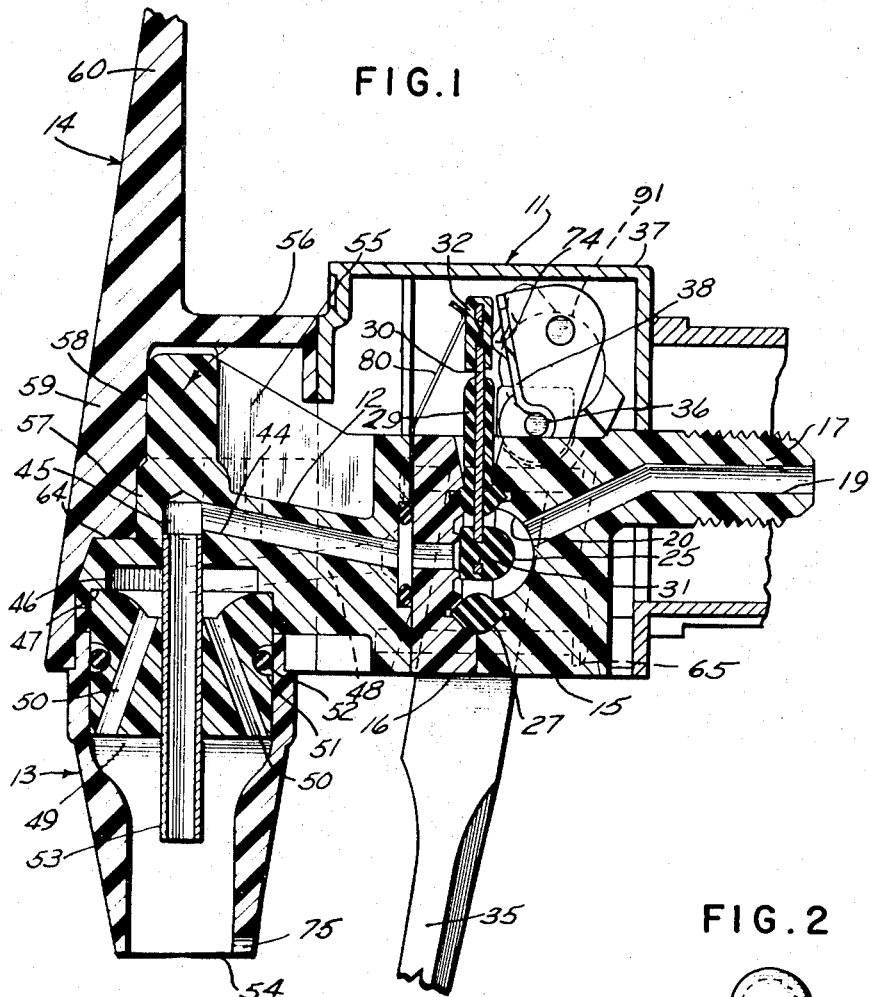
FIG.1
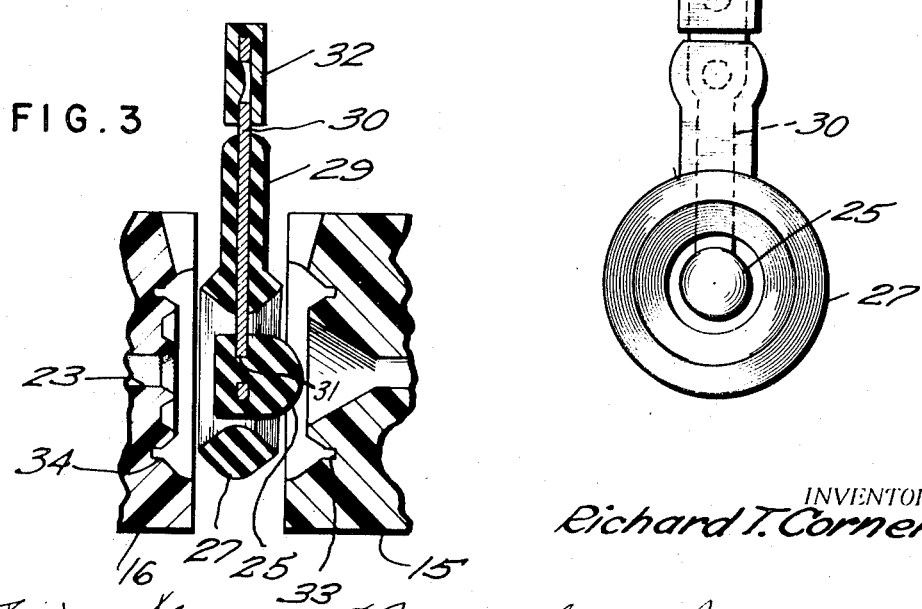
FIG.2
FIG.3
INVENTOR.
Richard T. Cornelius
ATTORNEYS

1

VALVE ASSEMBLY

CROSS-REFERENCE TO RELATED APPLICATION

This application is a continuation-in-part of my copending U.S. Pat. application Ser. No. 497,417, filed Oct. 18, 1965, now U.S. Pat. No. 3,455,332 entitled "POST-MIX VALVE".

BACKGROUND OF THE INVENTION

1. Field of the Invention

This invention relates to a valve assembly having a pallet-type of valve

2. Description of the Prior Art

In my above-identified application, I have disclosed a valve assembly having a pallet-type of valve in which I employed elastomeric material having the same hardness for the sealing ring as for the valve member itself. While such a structure as disclosed and claimed in the parent application is advantageous and useful, when that structure was associated with installations having a wide range of inlet pressures, some unexpected difficulties were obtained in connection with actuating force and sealing.

SUMMARY OF THE INVENTION

According to this invention, the sealing ring and the valve member are constructed of elastomeric materials which have a degree of hardness unlike that of the other, the valve member material preferably being softer than the sealing ring material.

Accordingly, it is an object of the present invention to provide a valve assembly which can reliably be used with a wider range of pressure drops than was practical with prior constructions.

Another object of the present invention is to provide a structure which can be adapted to lower or higher pressure drops during manufacture by mere alteration of the hardness of certain elastomeric material.

The novel features which I believe to be characteristic of my invention are set forth with particularity in the appended claims. My invention itself, however, both as to its manner of construction and method of operation, together with further objects and advantages thereof, may best be understood by reference to the following description, taken in connection with the accompanying sheet of drawings in which:

FIG. 1 is a vertical cross-sectional view of a valve assembly embodying the novel features of the present invention;

FIG. 2 is an enlarged front elevational view of a sealing ring and valve member employed in the valve assembly; and FIG. 3 is an enlarged side view partly in cross section of a sealing ring and valve member with the parts in which it is mounted exploded and broken away.

As SHOWN ON THE DRAWINGS

The principles of this invention are particularly useful when embodied in a valve assembly such as shown in FIG. 1, which is exemplary of a valve construction having the present invention. The exemplary valve assembly is a fluid mixing and dispensing apparatus which includes a valve portion 11, a delivery duct bracket 12, a mixing chamber and delivery spout 13 and a shroud 14.

The valve portion 11 includes a pair of blocks 15 and 16 of plastic material secured together by a plurality of thread fastening means 65. The block 15 is provided with a pair of projecting fittings 17 (one of which is obscured by the other) which are arranged to be connected respectively to a syrup or other concentrate supply source and to a source of carbonated water. A fluid passageway 19 extends through the fitting 17 and the block 15 to a dome-shaped recess 20 formed in the interface of the block 15. A similar construction is present for the other fitting. The block 16 is provided with a duct 23 for each recess 20 passing through the block 16 and which opens into the dome-shaped region provided by the recess 20. The upstream end of the duct 23 provides a valve seat against which a movable valve member 25 is arranged to be seated.

The valve 25 is formed as an assembled part of a ring seal 27 which is clamped between the confronting faces of the blocks 15 and 16. The ring seal 27 has a radially outwardly extending integral arm 29 through which a metal leaf or finger 30 extends, the same constituting a rigid actuating arm. The opposite end of the finger or arm 30 extends radially inwardly into the center of the ring 27 and has the valve member 25 molded thereon and through an opening 31 formed in the radially inwardly projecting end of the finger. Rocking movement of the finger 30 using the ring seal or sealing ring 27 as a fulcrum point causes movement of the valve member 25. The radially outwardly projecting end of the actuating arm 30 has a molded button 32 snapped thereon or otherwise attached thereto for engagement by a further actuating arm hereinafter to be described. The ring seal 27 and its associated upwardly extending portion 29 which covers part of the metal finger 30 and also the valve member 25 are constructed of elastomeric material such as rubber or other rubberlike material. The outer button 32 is formed of a different material which is more wear resistant and preferably is some form of rigid plastic.

According to the present invention, the sealing ring 27 and the valve member 25 are constructed of elastomeric materials that have a degree of hardness that differs one from the other. In a preferred embodiment of this invention, the material of the valve member 25 is softer than the material of the sealing ring 27. A preferable range of hardness for the valve member material is between 40 and 50 Durometer, while a preferable range of hardness for the sealing ring material is 60 to 70 Durometer. When these two ranges are used concurrently, a structure is provided which has been demonstrated to be reliable for pressure drops falling in the range of 7 to 70 p.s.i. To provide a valve assembly for a lower operating pressure, material hardnesses should be used which are less than those stated, and conversely, to provide a valve assembly to be used for higher pressure drops, higher degrees of hardness should be employed. As a practical matter, the range of 7 to 70 p.s.i. is a range that for all practical purposes covers applications which involve the handling of carbonated beverages or their ingredients.

In order to enable the quick alignment of the sealing ring 27, the sealing ring is preferably not circular in radial cross section, but rather is a torous whose radial cross section has a free shape that is noncircular. As disclosed, this shape has a relatively sharp peripheral edge on each face. The blocks 15 and 16 are normally in direct engagement with each other and they have a groove of fixed cross-sectional size that corresponds in size and shape to the noncircular cross-sectional shape of the sealing ring, and where, as here, the sealing ring has a relatively sharp peripheral edge on each face, the block 15 is additionally provided with a small circular groove 33 therein while the block 16 has a corresponding small groove 34 therein for receiving these sharp inner and outer peripheral edges of the sealing ring. This construction enables quick alignment of the sealing ring and proper position with the valve member 25 centered over the valve seat.

The valve member 25 is preferably flat on its face which is arranged to be seated on the valve seat provided by the upstream end of the duct 23. The opposite face of the valve member 25 is dome or bullet shaped to spread the flow of fluid thereover evenly when the valve is in its open position to minimize turbulence, a property that is particularly important when handling a carbonated water.

Suitable actuating means is provided for the valve 25 in the form of a lever 35 which is pivotally mounted as at 36 to the housing 37 which encloses the valve mechanism. The lever 35 extends above its pivotal point 36 for engaging a plate 38 which is carried loosely on the pivot pin 36, the upper end of the lever 35 being widened toward the viewer to engage the plate 38 to rock the same against the button 32 in a counterclockwise direction as shown in FIG. 1 to open the valve member 25. By virtue of a similar construction at the other side, the other nonillustrated valve member is similarly and simultaneously actuated by the lever 35. When the button 32 is engaged, the upstanding finger or actuating arm 30 is rocked in a counterclockwise direction about the fulcrum point provided by the sealing ring 27 to lift the valve member 25 from its valve seat, as stated. The plate 38 has a transverse rib 74 formed therein to reduce the amount of friction caused by the slight sliding of the plate 38 against the cooperating button 32.

The member 12 has a duct 44 leading from the valve seat to a central downwardly extending opening 45. The member 12 has a second duct 48 leading from the other valve seat to a downwardly facing recess 46 having an intermediate shoulder 47 formed in the wall of the recess. The duct 48 leads to the recess 46 having an entry that is tangential with respect to the circular recess 46.

A plug member 49 fits into the recess 46 as far as the shoulder 47 and has a plurality of downwardly diverging ducts 50 which are arranged to pass carbonated water from the chamber provided by the recess 46 to the lower end of the plug 49. The plug 49 has a circumferential groove 51 in which an O-ring 52 is disposed. The spout 13 forms a tight friction fit over the O-ring 52. A delivery tube 53 extends centrally through the plug 49 through the recess 46 and up into the downwardly directed opening 45. The tube 53 is of such length as to extend below the lower end of the plug 49 for discharging syrup or other concentrate into the water to effect mixing.

The lower edge 54 of the spout 13 has a notch 75 for minimizing dripping.

The delivery duct bracket 12 has an upstanding web 55 which reinforces an upstanding post 56 which is circular in cross section in its lower part 57 and rectangular in cross section in its upper part 58. The shroud 14 has a body portion 59 which nests over the post 56 and the web 55, and the shroud also includes an upstanding bladelike portion 60.

The fitting 17 is connected to a source of syrup or concentrate while the obscured fitting is connected to a source of carbonated water, both sources being pressurized. Movement of the operating lever 35 in a counterclockwise direction rocks the rigid actuating arm 30 in a counterclockwise direction to lift each valve member 25 from its seat.

If desired, a biasing means in the form of a leaf spring 80 may be provided to retain the valve member 25 in its closed position.

If desired, the present exemplary embodiment may include an auxiliary actuator (not shown) but disposed on the other side of the housing 37 and connected to a finger 91 for engaging only one of the plates 38, for example to obtain only a flow of charged water.

According to this invention, a manufacturer can provide a basic valve assembly construction using one set of tooling, and merely by selectably varying the hardnesses of the sealing ring 27 and the valve member 25 during the molding thereof onto the rigid actuating arm 30, a device is produced which is tailored for a particular pressure range as desired. At low pressure drops, a relatively soft sealing ring material can be employed and such low inlet pressure or pressure drop will tend to produce a relatively small valve-closing force. Complementary therewith, such a sealing ring will also produce a relatively low torsion. In conjunction therewith, a still softer valve member material would be employed to facilitate and insure good sealing at the valve seat. As the inlet pressures or pressure drops go higher, a higher torsion is provided by a harder sealing ring and a greater force is applied by inlet pressure against the valve member 25, necessitating that its hardness be also increased, but still kept below that of the sealing ring in the preferred embodiment. In some instances, it may be desirable to have the sealing ring 27 made of softer material than the valve member 25, and if this should occur, the leaf spring plate 80 may be employed to supplement the torsion produced by a softer sealing ring. By use of the teachings herein, any problem caused by a tendency of elastomeric material to cold-flow can be readily overcome.

Although various minor modifications might be suggested by those versed in the art, it should be understood that I wish to embody within the scope of the patent warranted hereon, all such embodiments as reasonably and properly come within the scope of the appended claims.

I claim:
1. In a valve assembly including:
  a. a pair of blocks having confronting faces detachably secured together,
    1. at least one of said faces being recessed to provide a valve chamber,
    2. one of said blocks having an inlet duct passing therethrough into said chamber,
    3. the other of said blocks having a discharge duct passing therethrough and opening at one end into said chamber,
    4. the chamber end of said discharge duct providing a valve seat;
  b. a sealing ring of flexible elastomeric material clamped in a groove in at least one of said blocks and in spaced relation around said valve seat and providing a fluid seal between said blocks;
  c. a rigid actuating arm formed integral with said flexible sealing ring, said arm extending radially inwardly of said ring to provide an inner end opposite said valve seat, and which extends radially outwardly of said sealing ring beyond the outer periphery of said blocks, said ring providing a fulcrum for rocking movement of said arm;
  d. a valve member of flexible elastomeric material formed integral with said inner end of said rigid arm and positioned to be rocked into valve closing position against said seat and to valve opening position by rocking movement of said arm; and
  e. said elastomeric materials each having a degree of hardness unlike that of the other.

2. A valve assembly according to claim 1 in which the valve member material is softer than the sealing ring material.

3. A valve assembly according to claim 2 in which the valve member material has a hardness in the range of 40 to 50 Durometer.

4. A valve assembly according to claim 3 in which the sealing ring material has a hardness in the range of 60 to 70 Durometer.

5. A valve assembly according to claim 2 in which the sealing ring material has a hardness in the range of 60 to 70 Durometer.

6. A valve assembly according to claim 1 in which said sealing ring has a free noncircular cross-sectional shape corresponding in size and shape to said groove in the blocks, said faces of said blocks being in engagement with each other, whereby said groove in the blocks is of fixed size.